July 25, 1933.  G. C. WEILAND  1,919,872
TEMPERING
Filed Aug. 21, 1931  2 Sheets-Sheet 1
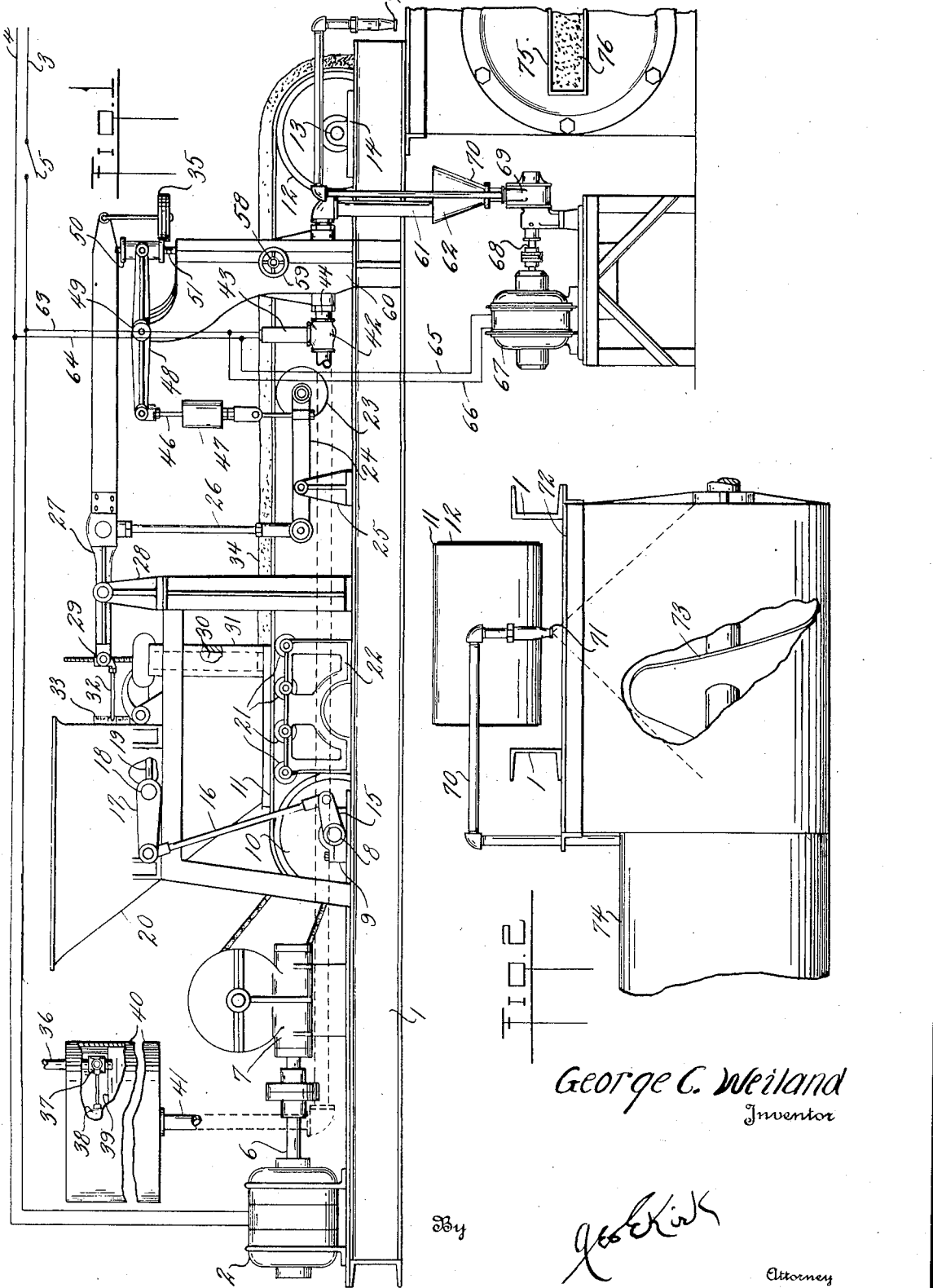
George C. Weiland
Inventor
By
Geo E Kirk
Attorney

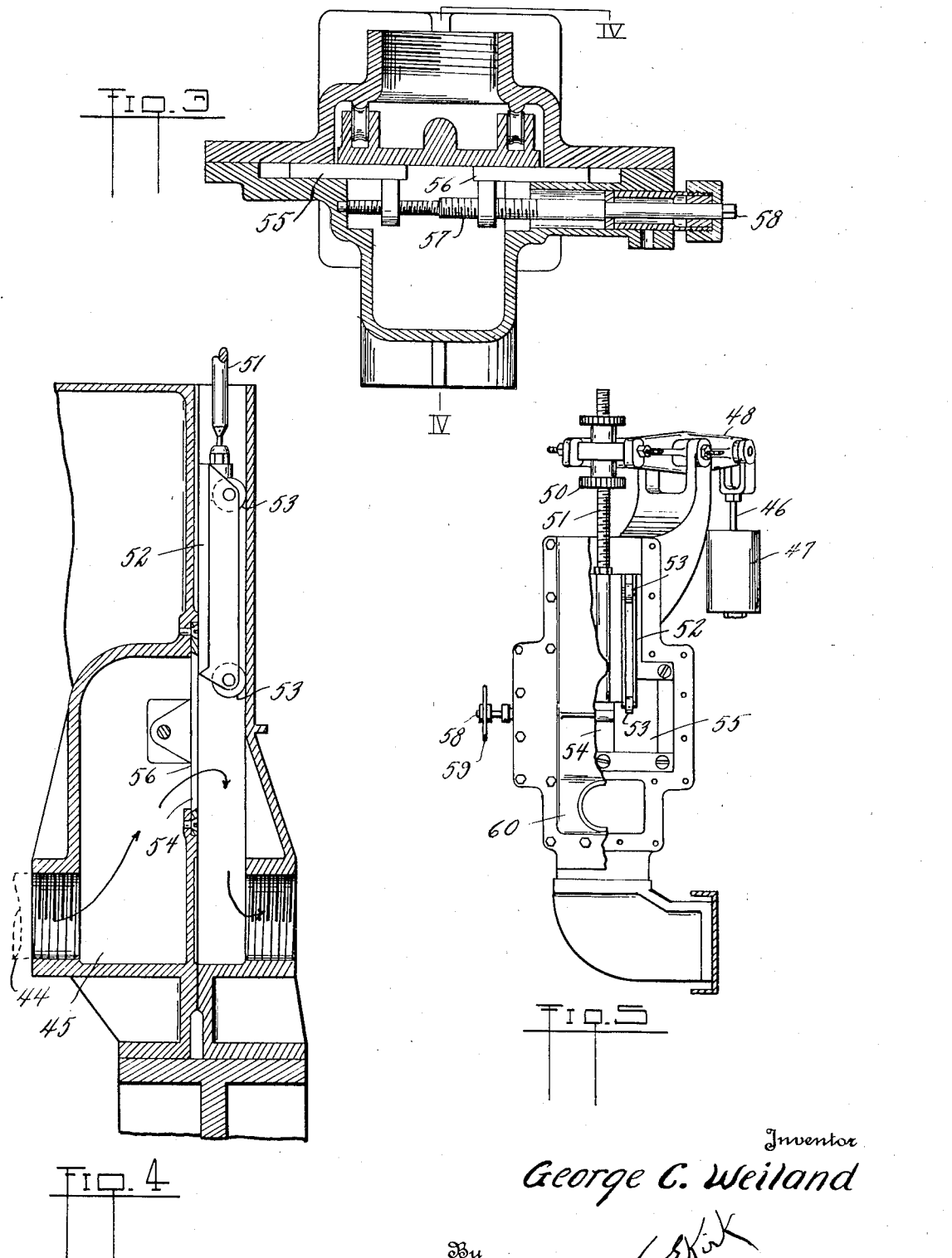

Patented July 25, 1933

1,919,872

UNITED STATES PATENT OFFICE

GEORGE C. WEILAND, OF PITTSBURGH, PENNSYLVANIA, ASSIGNOR TO SCHAFFER POIDOMETER COMPANY, OF PITTSBURGH, PENNSYLVANIA, A CORPORATION OF PENNSYLVANIA

TEMPERING

Application filed August 21, 1931. Serial No. 558,471.

This invention relates to humidity control for material.

This invention has utility when incorporated in pugging clay.

Referring to the drawings:—

Fig. 1 is a side elevation, with parts broken away, of an embodiment of the invention in a clay product installation for the production of brick;

Fig. 2 is a detail view, with parts broken away, from the right of Fig. 1;

Fig. 3 is a horizontal section through the automatic control valve for the water supply;

Fig. 4 is a section on the line IV—IV, Fig. 3; and

Fig. 5 is a side elevation of the valve of Fig. 3, parts being broken away.

Mounted upon main frame 1 is motor 2 having electric current supply lines 3, 4, thereto to be cut in by closing of switch 5. This motor 2 has shaft 6 driving speed reduction gearing 7 for actuating shaft 8 mounted on bearings 9 on the frame 1. This shaft 8 is provided with pulley 10 about which extends conveyor belt having upper reach 11. This belt is an endless conveyor extending about pulley 12 on shaft 13 mounted in bearings 14 on the frame 1.

The shaft 8 is provided with crank 15 from which upwardly extends connecting rod 16 to crank 17 on rock shaft 18 to operate agitator 19 in hopper 20. There is thus minimized occasion for hanging of a supply of clay in this hopper 20 to flow down through the hopper 20 and rest upon the upper reach 11 of the endless belt conveyor. Beneath the hopper 20, rollers 21 carried by auxiliary frame 22 on the main frame 1, sustain this belt reach 11 in proximity to the open bottom of the hopper 20. This support by the rollers 21 is adjacent the pulley 10.

Toward the pulley 12 there is located on the underside of this belt reach 11, roller 23 mounted on lever 24 carried by fulcrum bracket 25 mounted on the frame 1. This lever 24 extends past the bracket 25 and is there connected to upwardly-extending link 26 engaging with lever 27 mounted on fulcrum frame 28 rising from the frame 1, and toward the hopper 20 from the roller 23.

This lever 27 has adjustable connection 29 with gate 30 vertically shiftable in guide box 31 to vary the clearance of the gate 30 from the upper surface of the belt reach 11. The extent of this clearance is disclosed by indicator 32 in its position as to scale 33. It is thus seen that in the operation of the motor 2 in driving the endless belt from the pulley 10 to have its upper reach 11 pass to the pulley 12, there is a withdrawal from the hopper 20 of clay 34 in a quantity weighed per lineal foot and thus at a given speed for the belt, approximating delivery of a definite tonnage per hour.

The position for equilibrium of the lever 27 may be adjusted or controlled by changing load 35 at the long arm terminus of this lever 27.

Water supply line 36 has valve 37 controlled by float 38 for maintaining water 39 as a reserve in tank 40. There is thus provided a constant head for the water to flow by pipes 41 past valve 42 having solenoid 43 energized by the closing of the switch 5 to open the valve 42. Delivery of water from the valve 42 by pipe 44 into chamber 45 thus occurs only during delivery operation of the endless conveyor having the upper reach 11.

From the lever 24 there extends upwardly link 46 having adjustable loading 47. This link 46 extends to lever 48 mounted in fulcrum bracket 49 and provided with an adjustable connection 50 to rod 51 extending downwardly to valve plate 52 having rollers 53 holding such against port 54. There is thus provided a gate to the chamber 45. This gate to the chamber 45 has its width adjusted by plates 55, 56, movable toward and from each other by differential screw 57 having its terminus 58 mount hand wheel 59. It is thus seen that during the operation of this conveyor the controller for the clay 34 has interconnected therewith a control for water. Dry clay weighs more per cubic foot than moist clay. Accordingly, as the lever 27 checks down for reducing the quantity of the clay 34 on the conveyor there is simultaneous automatic response for a wider opening of the valve gate 52 to allow a greater quantity of water to pass this valve through the valve housing 60 and by pipe 61 to hopper 62. As the clay 34 on the belt is more moist its bulk is greater and this valve is automatically shifted to check or reduce the supply of water to the funnel 62.

The closing of the switch 5 besides having branch electric lines 63, 64, to energize the solenoid 43 in opening the valve 42 has lines 65, 66, to motor 67 having shaft 68 operating rotary pump 69. This pump 69 receives its water supply from hopper 62 and delivers such water supply by riser pipe 70 to jet nozzle 71 located in hopper 72 into which the clay 34 falls in its delivery by the conveyor. In practice this water is put under such pressure that it spreads as a mist into the clay to be conduced by scroll 73 for kneading and working in pug mill 74 and delivers therefrom, say through die 75 in the production of an article of clay, say brick 76.

In the brick or tile making operations hereunder the tempering of the clay may be uniformly effected. This desirable working, to reduce or materially minimize the drying and result in an article of body to hold up for firing is effected with a minimum of moisture for efficient operation of the pug mill. By the pressure spray for mist dispersion of the moisture there is no collection of globules of water, but such a permeating through the mass of nearly dry mud that it possesses a surface lubrication reducing the resistance of the mass as kneaded and squeezed through the mill and die. This lubrication materially reduces the friction and is of such minor volume that there is entire absence of oozing of moisture. While the spraying operation in itself is efficient, as herein shown connected up for automatic volume control responsive to the set condition of the clay, it is possible to predetermine just what minimum of moisture may be supplied. This volume ratio is nicely adjusted to requirements by the hand wheel 59. With this volume checked for the plant, there is herein automatic response to the variation in the dryness of the clay.

What is claimed, and it is desired to secure by United States Letters Patent is:

Clay handling equipment comprising a hopper, a conveyor to which material to be treated is delivered from the hopper, a receiver for the material from the conveyor, a gate at the hopper regulating the material flow from the hopper to the conveyor, a liquid supply line having a valve therein, a movable support for the conveyor intermediate its length having connections to the gate and to the valve whereby both the material flow to the conveyor and the flow of liquid through the valve are regulated by the weight of the material only on the conveyor, and a pump for receiving the liquid flow volume as controlled by the valve for converting such into a pressure stream for force discharge into the material in the receiver.

GEORGE C. WEILAND.